(12) United States Patent
Bangolae et al.

(10) Patent No.: US 10,667,321 B2
(45) Date of Patent: May 26, 2020

(54) EVOLVED NODE-B, USER EQUIPMENT, AND METHODS FOR TRANSITION BETWEEN IDLE AND CONNECTED MODES

(71) Applicant: Intel IP Corporation, Santa Clara, CA (US)

(72) Inventors: Sangeetha L. Bangolae, Beaverton, OR (US); Richard C. Burbidge, Shrivenham (GB); Mo-Han Fong, Sunnyvale, CA (US); Youn Hyoung Heo, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 141 days.

(21) Appl. No.: 14/927,928

(22) Filed: Oct. 30, 2015

(65) Prior Publication Data

US 2016/0234877 A1 Aug. 11, 2016

Related U.S. Application Data

(60) Provisional application No. 62/113,925, filed on Feb. 9, 2015.

(51) Int. Cl.
*H04W 76/27* (2018.01)
*H04W 4/70* (2018.01)
*H04W 76/38* (2018.01)

(52) U.S. Cl.
CPC ............. *H04W 76/27* (2018.02); *H04W 4/70* (2018.02); *H04W 76/38* (2018.02)

(58) Field of Classification Search
CPC .. H04W 4/005; H04W 76/046; H04W 76/068
See application file for complete search history.

(56) References Cited

U.S. PATENT DOCUMENTS 9,743,396 B2 * 8/2017 Anderson ............. H04W 76/38
2012/0044836 A1 * 2/2012 Sivavakeesar ........ H04W 24/02
370/255

(Continued)

FOREIGN PATENT DOCUMENTS

EP 2509374 10/2012
EP 2725852 4/2014

(Continued)

OTHER PUBLICATIONS

"International Application Serial No. PCT/US2016/013202, International Preliminary Report on Patentability dated Aug. 24, 2017", 11 pgs.

(Continued)

*Primary Examiner* — Asad M Nawaz
*Assistant Examiner* — Berhanu D Belete
(74) *Attorney, Agent, or Firm* — Schwegman Lundberg & Woessner, P.A.

(57) ABSTRACT

Embodiments of an Evolved Node-B (eNB) and methods for transition between idle and connected modes are disclosed herein. The eNB may receive uplink data packets from a User Equipment (UE) using a lightweight Radio Resource Control (RRC) connection between the eNB and the UE. The eNB may transmit an RRC connection release message to the UE to indicate a transition of the UE to an RRC idle mode for the RRC connection. The RRC connection release message may include an indicator of whether the UE is to store context information for the RRC connection. The eNB may further receive additional uplink data packets according to the stored context information using a lightweight RRC connection.

6 Claims, 9 Drawing Sheets

(56) References Cited

U.S. PATENT DOCUMENTS

| | | | | |
|---|---|---|---|---|
| 2012/0307780 | A1* | 12/2012 | Mochizuki | H04W 72/0406 370/329 |
| 2013/0010768 | A1 | 1/2013 | Lee et al. | |
| 2013/0016665 | A1* | 1/2013 | Kubota | H04W 36/0022 370/328 |
| 2013/0039287 | A1* | 2/2013 | Rayavarapu | H04W 76/28 370/329 |
| 2013/0039339 | A1* | 2/2013 | Rayavarapu | H04W 76/19 370/331 |
| 2013/0051338 | A1 | 2/2013 | Ryu et al. | |
| 2013/0260740 | A1* | 10/2013 | Rayavarapu | H04W 76/27 455/422.1 |
| 2013/0260810 | A1* | 10/2013 | Rayavarapu | H04W 76/19 455/509 |
| 2013/0260811 | A1* | 10/2013 | Rayavarapu | H04W 76/19 455/509 |
| 2013/0324141 | A1 | 12/2013 | Jung et al. | |
| 2013/0343280 | A1* | 12/2013 | Lee | H04L 63/20 370/328 |
| 2014/0003348 | A1* | 1/2014 | Velev | H04W 60/06 370/328 |
| 2014/0269779 | A1 | 9/2014 | Shan et al. | |
| 2014/0321371 | A1* | 10/2014 | Anderson | H04W 76/38 370/329 |
| 2014/0349662 | A1* | 11/2014 | Ekici | H04W 76/16 455/450 |
| 2015/0230276 | A1* | 8/2015 | Jung | H04W 72/06 370/229 |
| 2016/0014686 | A1* | 1/2016 | Cho | H04W 48/18 370/328 |
| 2016/0212638 | A1* | 7/2016 | Jain | H04W 72/0486 |
| 2017/0245318 | A1* | 8/2017 | Rayavarapu | H04W 76/27 |
| 2017/0325281 | A1* | 11/2017 | Hong | H04W 72/048 |
| 2018/0020418 | A1* | 1/2018 | Chandramouli | H04W 60/005 |

FOREIGN PATENT DOCUMENTS

| | | | | |
|---|---|---|---|---|
| EP | 2757856 | | 7/2014 | |
| WO | WO-2014052877 | A1 * | 4/2014 | |
| WO | WO-2014111345 | A1 * | 7/2014 | H04W 8/18 |
| WO | 2016130264 | | 8/2016 | |

OTHER PUBLICATIONS

"Technical Specification Group Services and System Aspects; Circuit Switched (CS) fallback in Evolved Packet System (EPS);", 3GPP TS 23.272 V12.4.0, (Sep. 2014), 100 pgs.

"Technical Specification Group Radio Access Network; Evolved Universal Terrestrial Radio Access (E-UTRA); Radio Resource Control (RRC);", 3GPP TS 36.331 V12.4.1, (Dec. 2012), 100 pgs.

"S1 Application Protocol (S1AP)", 3GPP TS 36.413 V12.4.0, (Dec. 2014), 300 pgs.

"Tunnelling Protocol for Control plane (GTPv2-C);", 3GPP TS 29.274 V12.7.0, (Dec. 2014), 314 pgs.

"International Application Serial No. PCT/US2016/013202, International Search Report dated Apr. 25, 2016", 3 pgs.

"International Application Serial No. PCT/US2016/013202, Written Opinion dated Apr. 25, 2016", 9 pgs.

"[Resubmitted] Updates to Small Data connection release in clause 5.1.1.3.1 (solution 1)", 3GPP Draft; S2-132473 Update to Small Data Connection Release in Clause 5.1.1.3.1 (Solution 1), 3rd Generation Partnership Project (3GPP), Mobile Competence Centre; 650, Route Des Lucioles; F-06921, (Jul. 9, 2013), 9 pgs.

"Chinese Application Serial No. 201680009285.2, Voluntary Amendment filed May 7, 2018", W/ English Claims, 30 pgs.

"European Application Serial No. 16749563.9, Extended European Search Report dated Jul. 30, 2018", 11 pgs.

"Japanese Application Serial No. 2017-540602, Voluntary Amendment Filed May 22, 2018", w/English Claims, 13 pgs.

"European Application Serial No. 18180972.4, Extended European Search Report dated Aug. 24, 2018", 7 pgs.

"European Application Serial No. 18180972.4, Response filed May 14, 2019 to Extended European Search Report dated Aug. 24, 2018", 26 pgs.

"Korean Application Serial No. 10-2017-7021456, Response filed May 10, 2019 to Notice of Preliminary Rejection dated Mar. 11, 2019", w English Claims, 20 pgs.

"Korean Application Serial No. 10-2017-7021456, Notice of Preliminary Rejection dated Mar. 11, 2019", w English Translation, 14 pgs.

* cited by examiner

EVOLVED NODE-B, USER EQUIPMENT, AND METHODS FOR TRANSITION BETWEEN IDLE AND CONNECTED MODES

PRIORITY CLAIM

This application claims priority under 35 USC 119(e) to U.S. Provisional Patent Application Ser. No. 62/113,925, filed Feb. 9, 2015, which is incorporated herein by reference in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to Machine Type Communication (MTC) operation. Some embodiments relate to radio resource control (RRC) modes, such as RRC idle mode or RRC connected mode.

BACKGROUND

A cellular network may be configured to support a variety of devices. As an example, devices configured for Machine Type Communication (MTC) operation may be supported by the network for communication of relatively small blocks of data at relatively infrequent rates. The management of connections between the network and supported devices may be challenging in some scenarios, such as when the network supports a large number of MTC devices and/or other devices. Accordingly, there is a general need for methods and systems for management of device connectivity in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
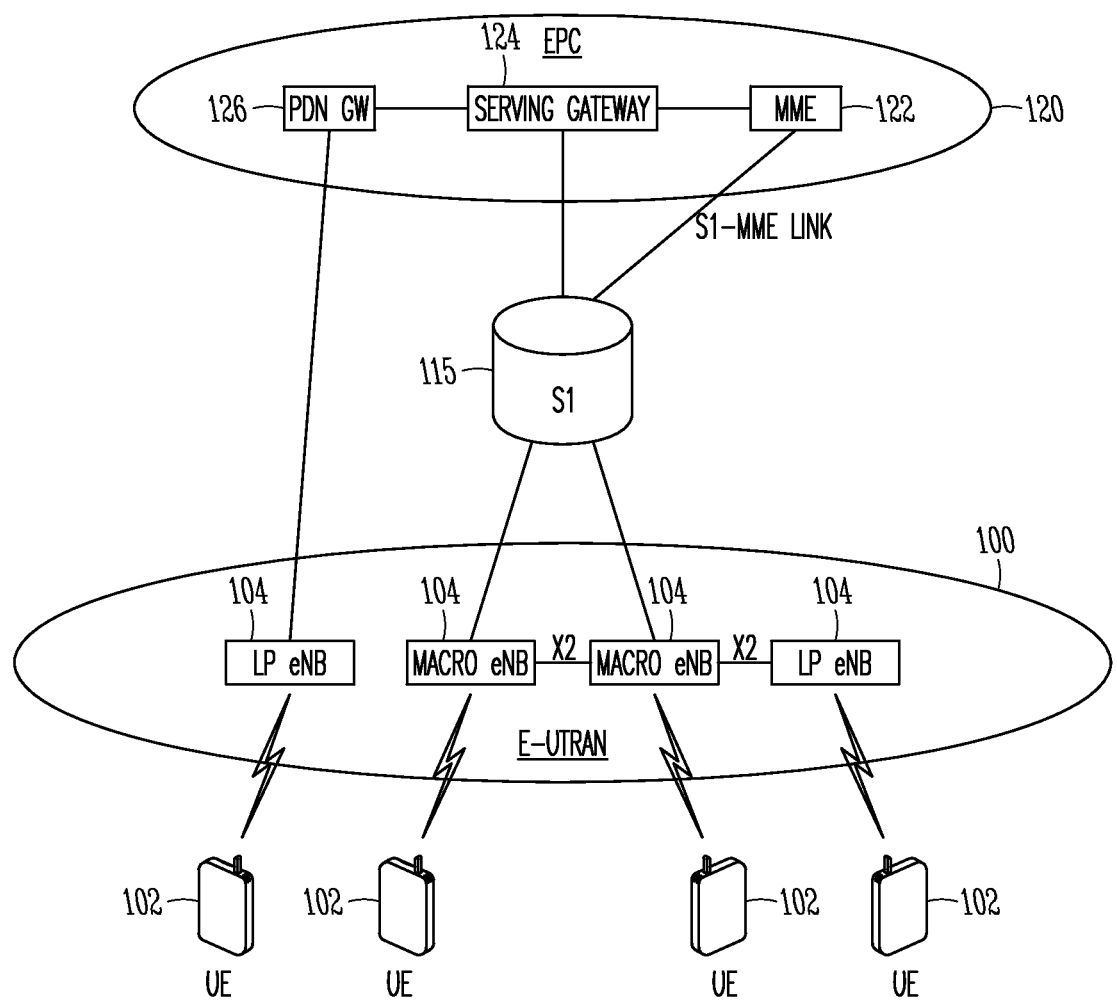
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may receive uplink data packets from the UE 102 on a Radio Resource Control (RRC) connection between the eNB 104 and the UE 102. The eNB 104 may transmit an RRC connection release message to the UE 102 to indicate a transition of the UE 102 to an RRC idle mode for the RRC connection. The eNB 104 may further receive additional uplink data packets according to the stored context information.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes. Furthermore, the MME 122 and the Serving GW 124 may be collapsed into one physical node in which case the messages will need to be transferred with one less hop.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and HARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
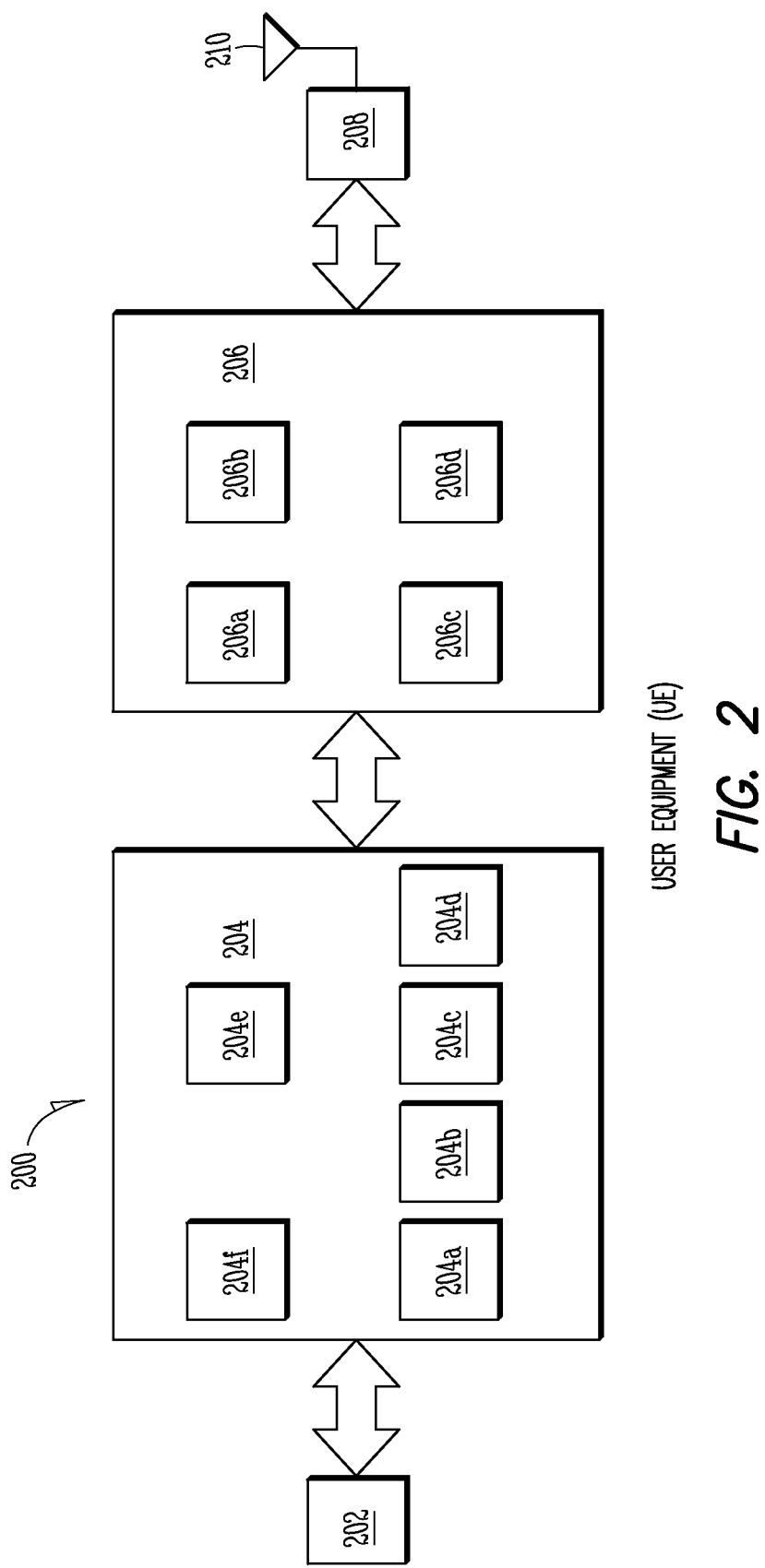
FIG. 2 is a functional diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fro). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
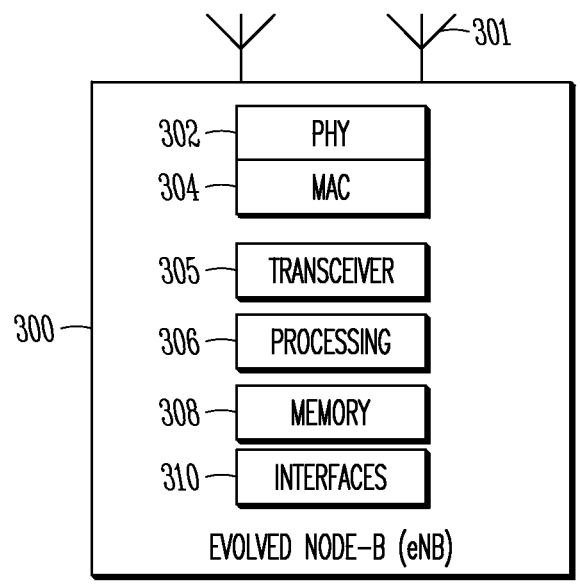
FIG. 3 is a functional diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the functionality described may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Figure 4:
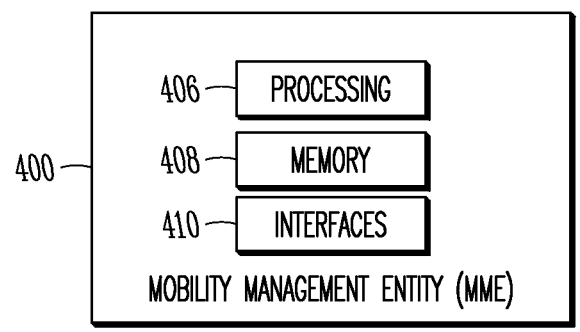
FIG. 4 is a functional diagram of a Mobility Management Entity (MME) in accordance with some embodiments.

FIG. 4 is a functional diagram of a Mobility Management Entity (MME) in accordance with some embodiments. The MME 400 may be suitable for use as an MME 122 as depicted in FIG. 1, in some embodiments. The MME 400 may include processing circuitry 406 and memory 408 arranged to perform the operations described herein. The MME 400 may also include one or more interfaces 410, which may enable communication with other components, including the eNB 104 (FIG. 1), the S-GW 122 (FIG. 1), components in the EPC 120 (FIG. 1) or other network components. In addition, the interfaces 410 may enable communication with other components that may not be shown in FIG. 1, including components external to the network. The interfaces 410 may be wired or wireless or a combination thereof.

Although the UE 200, the eNB 300, and the MME 400 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may receive uplink data packets from the UE 102 on a Radio Resource Control (RRC) connection between the eNB 104 and the UE 102. The eNB 104 may transmit an RRC connection release message to the UE 102 to indicate a transition of the UE 102 to an RRC idle mode for the RRC connection. The RRC connection release message may be based on an expiration of an inactivity timer for the UE 102. The RRC connection release message may include an indicator of whether the UE 102 is to store context information for the RRC connection. The eNB 104 may further receive additional uplink data packets on the RRC connection according to the stored context information. These embodiments will be described in more detail below.

Figure 5:
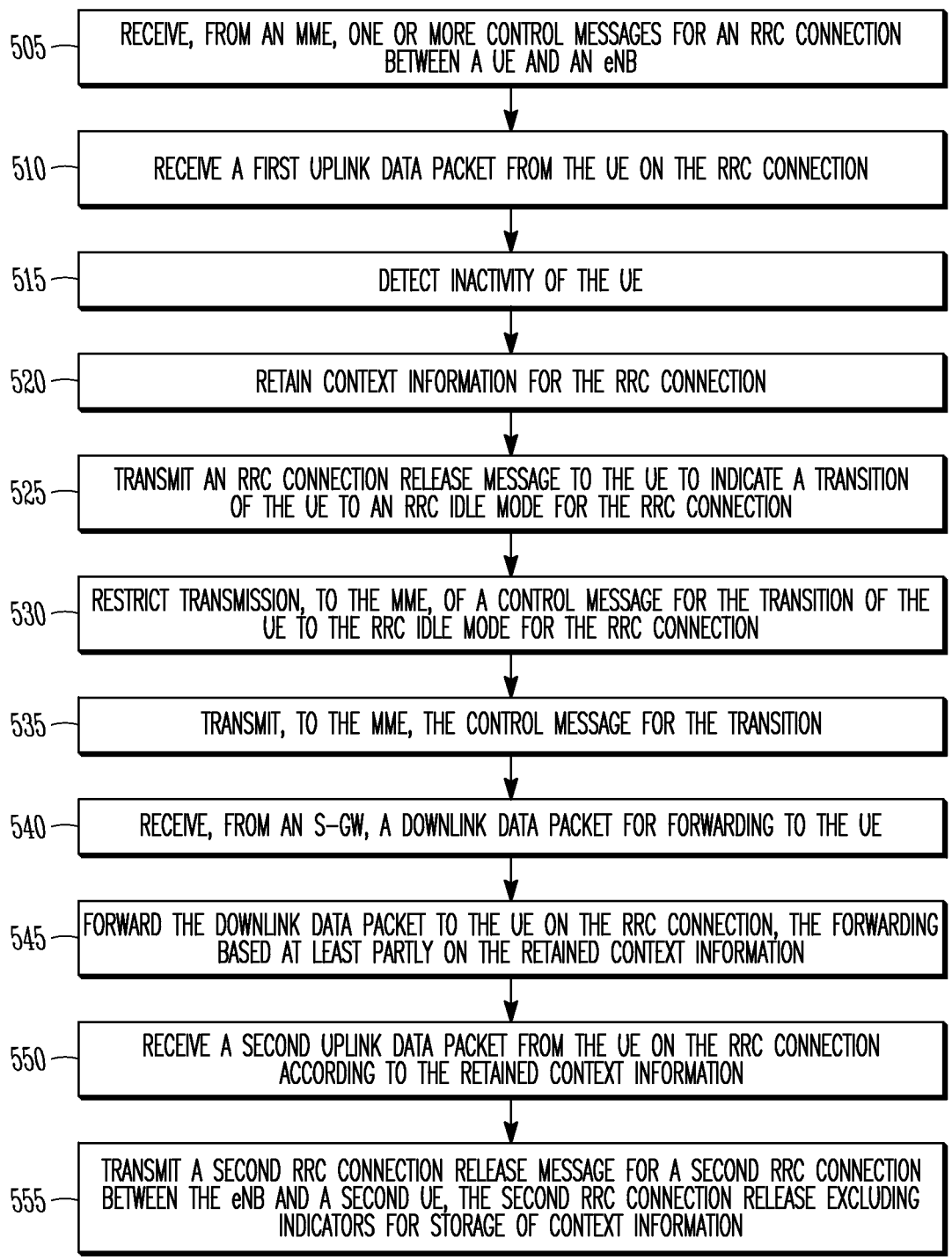
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-11, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 and other methods described herein may also be applicable to an apparatus for a UE 102, eNB 104 and/or MME 122 or other device described above.

At operation 505 of the method 500, the eNB 104 may receive, from the MME 122, one or more control messages for a radio resource control (RRC) connection between the eNB 104 and a UE 102. In some embodiments, the eNB 104 may transmit, to the MME 122, one or more control messages for the RRC connection. Accordingly, the eNB 104 and the MME 122 may exchange one or more such control messages. In some embodiments, the control messages may enable establishment of the RRC connection. In addition, capability information, configuration information and/or other information about the UE 102 may be exchanged between the eNB 104 and the MME 122 in these and/or other control messages. As a non-limiting example, setup control messages may be exchanged by the eNB 104 and the MME 122.

In some embodiments, the eNB 104 may transmit, to the MME, an indicator that the RRC connection is a lightweight RRC connection. The eNB 104 may be permitted to delay notification, to the MME, of a release of the lightweight RRC connection. As a non-limiting example, the indicator that the RRC connection is a lightweight RRC connection may be included in a control message such as a "UE Context Retained/UE Connection Suspended" control message. As another non-limiting example, the indicator that the RRC connection is a lightweight RRC connection may be included in a control message such as a "UE Context Release/UE State Change Notification" control message. These examples are not limiting, however, as the indicator may be communicated using other suitable control messages which may or may not necessarily be included in a 3GPP standard or other standard.

At operation 510, the eNB 104 may receive a first uplink data packet from the UE 102 on the RRC connection. In some embodiments, the first uplink data packet and possibly other uplink data packets may be transmitted by the UE 102 and/or received at the eNB 104 when the UE 102 is in RRC connected mode. That is, before a transition into an RRC idle mode, the UE 102 may transmit one or more uplink data packets on the RRC connection. In some cases, the UE 102 may also receive one or more downlink data packets transmitted from the eNB 104 while the UE 102 is in the RRC connected mode.

In some embodiments, the UE 102 may be configured to operate according to a Machine Type Communication (MTC) or Internet of Things (IoT) mode or protocol. As part of such operation, the UE 102 may exchange small quantities of data with the eNB 104 (or other device) at relatively infrequent rates. For instance, data blocks that include 100 bytes or fewer may be transmitted to the eNB 104 at a frequency of less than once per minute. The block size is not limited to 100 bytes, however, as other block sizes such as 20, 50, 200, 1000 or other number of bytes may be used in some cases. The frequency of transmission is also not limited to less than once per minute, as other frequency transmissions such as once per second, ten seconds, two minutes, ten minutes, one hour, one day or other period may be used in some cases.

In some embodiments, uplink data packets may be transmitted by the UE 102 according to a schedule or a time interval. As an example, the UE 102 may be configured to transmit an uplink data packet (or multiple packets) at least once per time interval. As another example, the UE 102 may be configured to transmit uplink data packets at regular intervals or at approximately regular intervals. As another example, the transmission of the uplink data packets may be performed infrequently and in a manner that may or may not necessarily be related to a schedule or an interval.

In some embodiments, the eNB 104 may be configured to transmit downlink data packets to the UE 102 at a rate that may be less frequent than a rate of uplink data packet transmission by the UE 102. In some non-limiting example scenarios, the UE 102 may transmit uplink data at regular intervals while the eNB 104 may transmit downlink data to the UE 102 less frequently or at non-regular intervals. In some of those scenarios, the exchanging of data may be unidirectional in general, such that downlink data transmission by the eNB 104 may be performed rarely or may not be performed. It should be pointed out that downlink control messages may be transmitted in some of those scenarios. As an example, the UE 102 may transmit measurements from a sensor or other component that may be forwarded by the eNB 104 to another component for processing.

In some embodiments, the eNB 104 may support a large number of MTC UEs 102 and/or other UEs 102, and management of RRC connections for the UEs may be challenging in some cases. For instance, there may be frequent transitions between modes such as RRC connected and RRC idle. The communication of such transitions to other components, such as the MME 122 and S-GW 124 and others, may overload or stress network resources. In addition, establishment and/or re-establishment of RRC connections for the UEs 102 may also utilize a significant amount of the network resources. Accordingly, techniques for management of the RRC connections in these and other scenarios may be beneficial.

At operation 515, the eNB 104 may detect inactivity of the UE 102. In some embodiments, the eNB 104 may maintain and/or monitor an inactivity timer for the UE 102 to determine the inactivity. The inactivity may be related to events such as reception, at the eNB 104, of data messages or other communication from the UE 102. As an example, the UE 102 may be considered inactive when such events are not detected during a monitoring period of the inactivity timer. Accordingly, the inactivity timer may expire and the UE 102 may transition or may be notified to transition to an RRC idle mode. As an example, a UE 102 configured to operate according to an MTC mode or protocol may perform uplink transmissions at an infrequent rate, and periods of inactivity between the uplink transmissions may be detected at the eNB 104.

At operation 520, the eNB 104 may retain context information for the RRC connection. In some embodiments, the context information may include an identifier of a data radio bearer (DRB) included in the RRC connection, access stratum (AS) security context and/or other information or other parameters. As an example, a security key for the RRC connection may be included in the context information. In some cases, the security key may be for a corresponding UE ID or may be related to a corresponding UE ID, although embodiments are not limited as such. In some embodiments, the context information may include information that may be exchanged as part of an establishment or re-establishment of an RRC connection or other connection.

As an example, the context information may be retained when the inactivity timer for the UE 102 has expired. As another example, the context information may be retained when the UE 102 has transitioned to an RRC idle mode and/or been notified to transition to the RRC idle mode. As another example, the context information may be retained when radio bearers related to the RRC connection have been suspended. The suspended radio bearers may remain established but may be inactive. As another example, the eNB 104 may retain context information between uplink transmissions by a UE 102 configured to operate according to an MTC mode or protocol.

Accordingly, when the context information for the RRC connection is retained by the UE 102, eNB 104 and/or other components, it may be possible for the UE 102 to return to the RRC connected mode without performance of some operations, such as setup operations. As such, a benefit may be realized in terms of an amount of network resources that may otherwise be used for the setup operations. In addition, a benefit may also be realized in terms of reduced sizes of signaling messages that may be transmitted in the radio bearer (over the air) and/or the S1 bearer.

At operation 525, the eNB 104 may transmit an RRC connection release message to the UE 102 to indicate a transition of the UE 102 to an RRC idle mode for the RRC connection. As previously described, the transition may be indicated in response to the expiration of the inactivity timer for the UE 102 at the eNB 104. It should be noted that, as previously described, embodiments are not limited to the chronological order of operations shown in FIG. 5. For instance, operation 525 may not necessarily occur in the order shown in FIG. 5 in some embodiments. An example of such will be described below.

In some embodiments, the RRC connection release message may include an indicator for storage, by the UE 102, of context information for the RRC connection. That is, the indicator may notify the UE 102 to store and/or maintain the context information. In some cases, the indicator may also inform the UE 102 that the eNB 104 and/or other components are to store and/or maintain the context information. In some cases, the RRC connection release message may serve to notify the UE 102 to release and/or suspend one or more bearers related to the RRC connection. In some embodiments, the RRC connection release message may be included in one or more standards, but embodiments are not limited as such.

Figure 6:
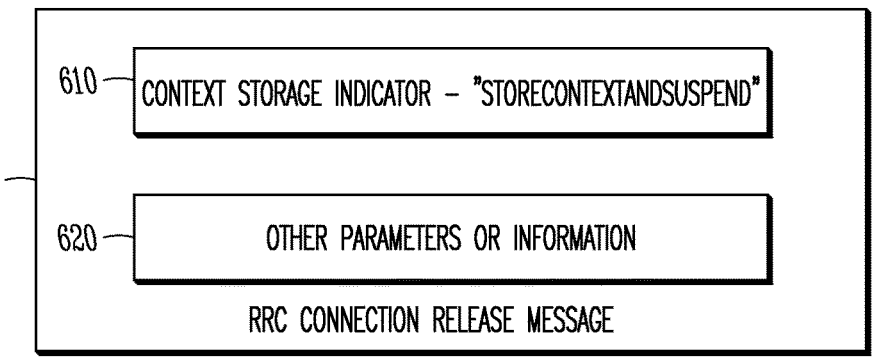
FIG. 6 illustrates an example of an RRC connection release message in accordance with some embodiments.

FIG. 6 illustrates an example of an RRC connection release message in accordance with some embodiments. Although embodiments are not limited as such, the RRC connection release message 600 may be or may be similar to an "RRCConnectionRelease" message that may be included in 3GPP standards or other standards. It should be noted that some embodiments may include some, any or all of the parameters shown in the example message 600, and some embodiments may also include additional parameters not shown in the example message 600. In addition, the order and format shown in the example message 600 are not limiting, and are presented for illustrative purposes. Parameter values may be given in any suitable format. As an example, some parameters may be Boolean, taking on values such as yes/no or similar. As another example, some parameters may take values of any suitable number of bits or other digits. As another example, some parameters may take descriptive values, which may be mapped to numbers in some cases.

The message 600 may include a context storage indicator 610, which may indicate whether or not RRC context information is to be stored when the RRC connection is released and/or bearers of the RRC connection are suspended. The message 600 may include other parameters or information 620, which may or may not be related to storage of context or the RRC connection. For instance, control information for the message 600 may be included.

Figure 7:
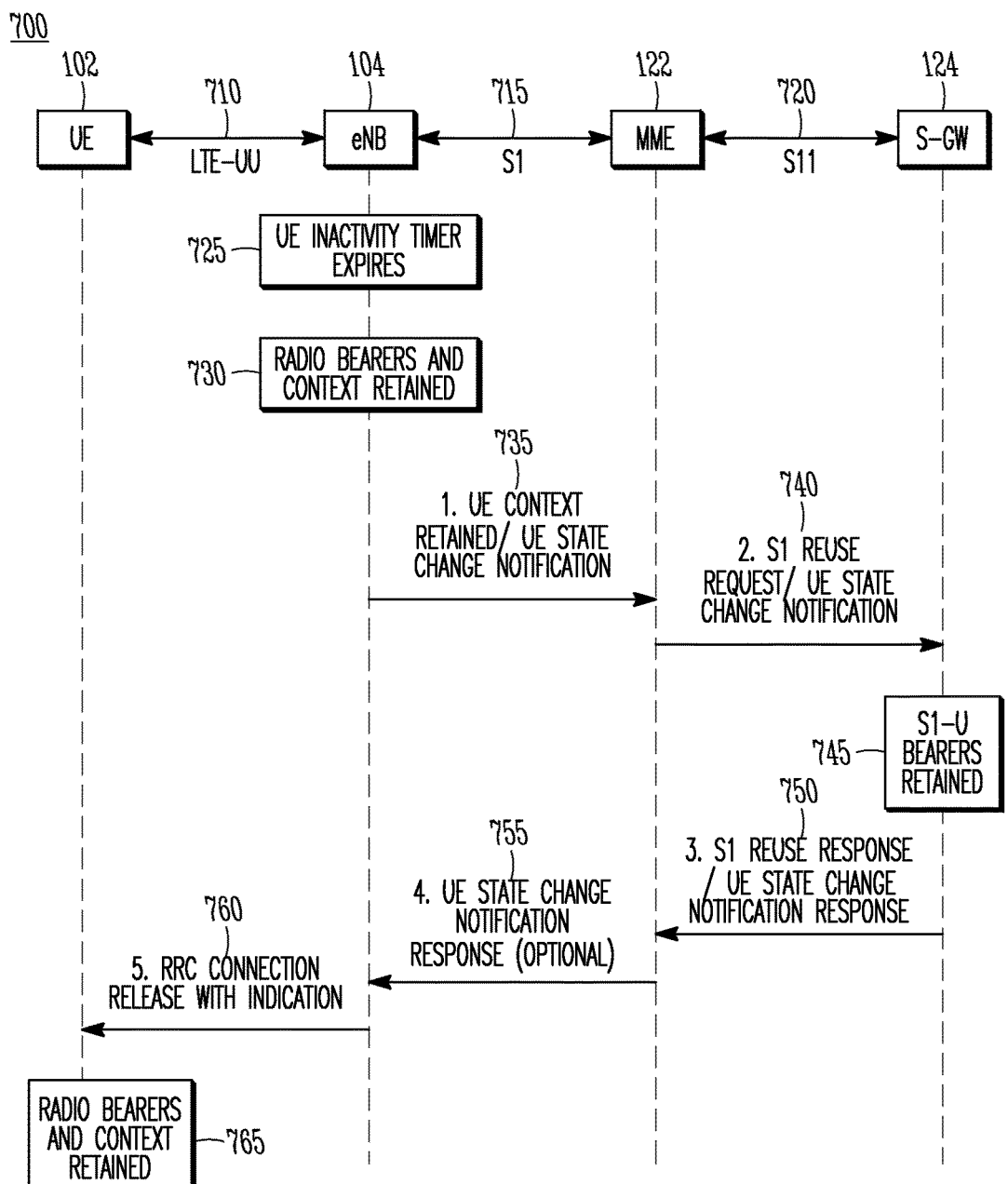
FIG. 7 illustrates an example message flow diagram in accordance with some embodiments.

FIG. 7 illustrates an example message flow diagram in accordance with some embodiments. Reference may be made to the message flow diagram 700 for illustration of messages, interfaces and events that may be related to some embodiments, but the diagram 700 is not limiting. Some embodiments may include operations that may be performed at the UE 102, eNB 104, MME 122 and/or S-GW 124, but embodiments are not limited to these devices. In some cases, techniques and concepts described herein may be applicable to operations and/or events shown in FIG. 7, including the RRC connection, RRC idle mode, RRC connected mode, RRC connection release, context information, and/or others. Some embodiments may include one or more operations shown in FIG. 7, and some embodiments may also include other operations described herein. In addition, embodiments are not limited to the chronological order of operations shown in FIG. 7.

The devices may exchange various messages, parameters and/or information over interfaces that may include, but are not limited to, those shown in FIG. 7. As an example, the UE 102 and the eNB 104 may communicate over the LTE-Uu interface 710. As another example, the eNB 104 and the MME 122 may communicate over the S1 interface 715. As another example, the MME 122 and the S-GW 124 may communicate over the S11 interface 720.

Referring to the FIG. 7, the message flow diagram 700 illustrates an expiration of the inactivity timer for the UE 102 at event 725. In some cases, the eNB 104 may decide whether to retain the context information for the UE 102. At operation 730, radio bearers and/or context may be retained. It should also be noted that at operation 760, the RRC connection release message may be transmitted to the UE 102 by the eNB 104. As described previously, the ordering of operations in some embodiments may be different than what is shown in FIG. 7. That is, operation 760 may not necessarily be performed after the other operations shown, in some cases.

Returning to the method 500, at operation 530, the eNB 104 may restrict transmission, to the MME 122, of one or more control messages for the transition of the UE 102 to the RRC idle mode for the RRC connection. At operation 535, the eNB 104 may transmit one or more control messages to the MME 122 that may indicate the transition of the UE 102 to the RRC idle mode. As a non-limiting example of such a message, a "UE context retained/UE state change notification" message may be transmitted by the eNB 104 to the MME 122 at operation 735 of the message flow diagram 700 in FIG. 7. An example of this message will be described in more detail below.

In some embodiments, the eNB 104 may be configured to refrain from transmitting the control messages and/or notifying the MME 122 of the transition of the UE 102 to the RRC idle mode. Accordingly, operation 535 may be excluded from some of those embodiments. In some embodiments, the eNB 104 may be configured to delay such notification of the transition. For instance, the eNB 104 may restrict the transmission of such control messages during a wait period. After the wait period, the eNB 104 may transmit one or more control messages to the MME 122 for notification of the transition of the UE 102 to the RRC idle mode. As an example, the eNB 104 may delay the transmission for any suitable reason such as resource availability, network congestion or other factors, and the wait period may refer to a duration of the delay. It should be noted that the wait period may not be limited to fixed time durations, as the resource availability, network congestion and other factors may be dynamic in some cases.

In some embodiments, the wait period may be a predefined and/or predetermined period, but these embodiments are not limiting. As an example, the wait time may refer to a time period between the transition and the time at which the eNB 104 notifies the MME 122 of the transition. In such cases, the eNB 104 may decide when to notify the MME 122 based on any number of factors such as network congestion, a number of UEs 102 supported, a number of messages queued at the eNB 104 awaiting transmission or other factors. Such an ability to delay the notification may provide the eNB 104 with scheduling flexibility for usage of the available network resources, such as system throughput or others. It should also be noted that some embodiments may not necessarily include the wait period for the transmission of the control messages and/or notification of the transition of the UE 102 to the RRC idle mode. That is, the eNB 104 may perform the transmission and/or notification without the wait period, in some cases.

Figure 8:
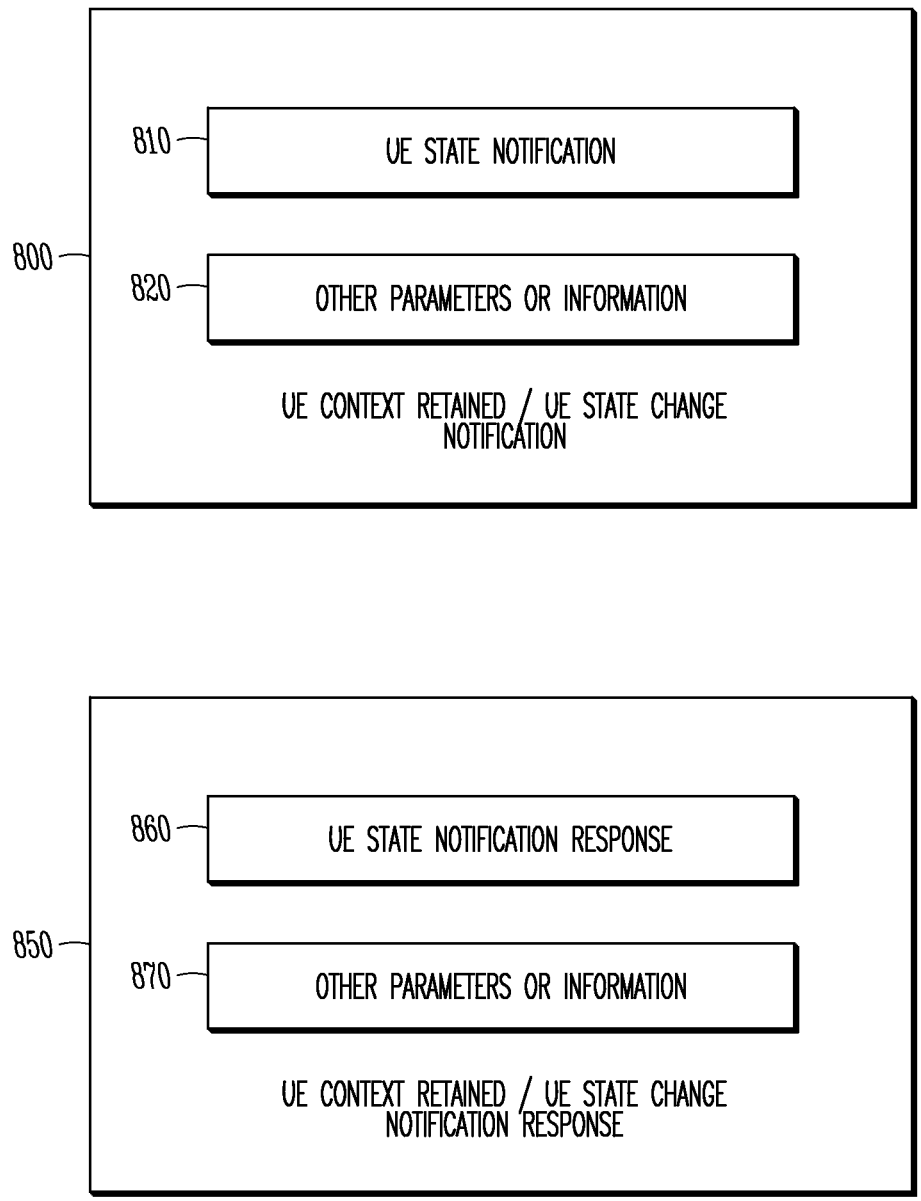
FIG. 8 illustrates example control messages related to UE context and UE state in accordance with some embodiments.

FIG. 8 illustrates example control messages related to UE context and UE state in accordance with some embodiments. Although embodiments are not limited as such, the messages 800 and 850 may be or may be similar to "UE Context Retained/UE State Change Notification" and/or "UE Context Retained/UE State Change Notification Response" messages that may be included in 3GPP standards or other standards. It should be noted that some embodiments may include some, any or all of the parameters shown in the example messages 800 and 850, and some embodiments may also include additional parameters not shown in the example messages 800 and 850. In addition, the order and format shown in the example messages 800 and 850 are not limiting, and are presented for illustrative purposes. Parameter values may be given in any suitable format. As an example, some parameters may be Boolean, taking on values such as yes/no or similar. As another example, some parameters may take values of any suitable number of bits or other digits. As another example, some parameters may take descriptive values, which may be mapped to numbers in some cases.

The UE Context Retained/UE State Change Notification message 800 may be transmitted by the eNB 104 to the MME 122. The message 800 may include a UE state notification parameter 810, which may take values such as "idle, context stored" or "idle, context suspended." The message 800 may include other parameters or information 820, which may or may not be related to storage of context or the RRC connection. For instance, control information for the message 800 may be included.

The UE Context Retained Response/UE State Change Notification Response message 850 may be transmitted by the MME 122 to the eNB 104. As a non-limiting example, the message 850 may be transmitted in response to reception of the message 800 at the MME 122. The response message 850 may include a UE state notification response parameter 860, which may take values such as "accept" or "failure" or similar. The values may refer to the state notification parameter 810 included in the message 800 in some cases. The message 850 may include other parameters or information 870, which may or may not be related to storage of context or the RRC connection. For instance, control information for the message 850 may be included.

Accordingly, the message 800 may enable the eNB 104 to inform the MME 122 of the state change of the UE 102 which may enable downlink communication through paging. In some embodiments, the message 800 may also enable the eNB 104 to block, stop or disable paging of the UE 102 when the UE 102 has connected back to the same eNB 104. The message 800 may be sent by the eNB 104 when the eNB 104 decides to store the context information for the UE 102, and the message 800 may inform the MME 122 that the UE 102 is in, or will be in, the RRC idle or RRC connected mode. The message 800 may also serve as a request for the MME 122 to notify the S-GW 124 to retain the S1-U context and to suspend the S1 bearers while noting the transition of the UE 102 to the RRC idle mode.

In some embodiments, the eNB 104 may receive a response, such as the UE Context Retained/UE State Change Notification Response message 850 or other message. Such a message may inform the eNB 104 whether or not the MME 122 accepts the decision and/or request from the eNB 104 to maintain context information for the RRC connection for the UE 102. As an example, the MME 122 may reject the request and may include a reason or cause in the message 850 or other message. As another example, the MME 122 may receive a rejection response from the S-GW 124 in response to a request or notification from the MME 122 to retain the context information and to suspend and/or hold the S1-U bearers while the UE 102 is in the RRC idle mode. As another example, the MME 122 may wait for a response from the S-GW 124 before sending the message 850. As another example, the message 850 may be sent asynchronously. Referring to FIG. 7, the message 850 or similar message may be transmitted by the MME 122 to the eNB 104 at operation 755.

Returning to the method 500, at operation 540, the eNB 104 may receive, from the S-GW 124, a downlink data packet for forwarding to the UE 102. The downlink data packet may be forwarded to the UE 102 on the RRC connection at operation 545. In some embodiments, the forwarding may be based at least partly on the retained context information for the RRC connection. That is, the packet may be received at the eNB 104 when the UE 102 is in the RRC idle mode and may be forwarded according to the retained context for the UE 102. In this case, one or more control messages that may otherwise be sent from the eNB 104 to the MME 122 and/or the S-GW 124 (or furthermore between the MME 122 and S-GW 124) may be avoided or may not need to be sent.

In some cases, an RRC connection release may be transmitted in response to the reception, at the eNB 104, of the packet from the S-GW 124. That is, the previously described transmission of the RRC connection release at operation 525 may be performed in response to or after operation 540 in some cases.

In an example scenario, the eNB 104 may support a large number of UEs 102, such as UEs 102 configured to operate according to an MTC mode or protocol and/or other UEs 102. The eNB 104 may wish to refrain from transmission of RRC connection release messages for such a large number of UEs 102, some of which may transition into the RRC idle mode frequently. When a downlink packet arrives at the eNB 104 for forwarding to one of the UEs 102, the UE 102 may not have been informed of the RRC connection release and/or to retain the context information. It may therefore become necessary for the eNB 104 to transmit the RRC connection release to the UE 102 with the indication to retain the context information.

In another example scenario, the eNB 104 may again support a large number of MTC capable UEs 102 and/or other UEs 102. The eNB 104 may have flexibility on if and/or when to send the RRC connection release messages. Such decisions may be based on the number of UEs 102 supported by the eNB 104, the type of UEs 102, requirements of the UEs 102 or other factors.

At operation 550, the eNB 104 may receive a second uplink data packet from the UE 102 on the RRC connection according to the retained context information. That is, the UE 102 and the eNB 104 may both retain the context information and the RRC connection may be used again for the second packet and possibly for other subsequent uplink data packets. As an example, the second uplink data packet may be received on the RRC connection after the transmission of the RRC connection release message and a first uplink data packet may be received on the RRC connection prior to the transmission of the RRC connection release message.

In some embodiments, the eNB 104 may transmit, to the MME 122, a control message that indicates a transition of the UE 102 from the RRC idle mode to an RRC connected mode for the RRC connection. As a non-limiting example, a "UE Context Retained/UE Connection Suspended" control message may be used. As another non-limiting example, a "UE Context Release (existing)/UE State Change Notification (new)" control message may be used. These examples are not limiting, however, as other control messages or other messages may be used.

In some embodiments, the control message that indicates the transition to the RRC connected mode may be transmitted in response to the reception, at the eNB 104, of the RRC Connection Request. That is, the eNB 104 may determine that the UE 102 has transitioned from the RRC idle mode to the RRC connected mode based on the reception of an uplink packet to initiate a lightweight RRC connection establishment, which could be triggered by available uplink data or paging for downlink information.

At operation 555, the eNB 104 may transmit a second RRC connection release message for a second RRC connection between the eNB 104 and a second UE 102. In some embodiments, the second RRC connection release message may exclude indicators for storage of context information. As an example, the second UE 102 may be configured to operate in a non-MTC mode or a "normal" mode. In this case, the eNB 104 may transmit an RRC connection release for an MTC UE 102 that indicates storage of context information and may transmit an RRC connection release for a non-MTC UE 102 that excludes such an indicator. Accordingly, the eNB 104 may decide to maintain context information for some UEs 102 and to not maintain context information for other UEs 102 in some embodiments.

In some embodiments, the eNB 104 may exchange control messages with the MME 122 that may be related to a transition of the UE 102 from the RRC idle mode to the RRC connected mode. Although not limited as such, techniques and/or operations described herein for exchanging of control messages for a transition of the UE 102 to the RRC idle mode may be used in some cases. As an example, the eNB 104 may delay the transmission, to the MME 122, of such a control message according to a wait period. The control message may be or may include an RRC connection release message or other message, in some cases. For instance, an indicator included in the RRC connection release message may indicate a transition of the UE 102 to the RRC idle mode or the RRC connected mode.

Figure 9:
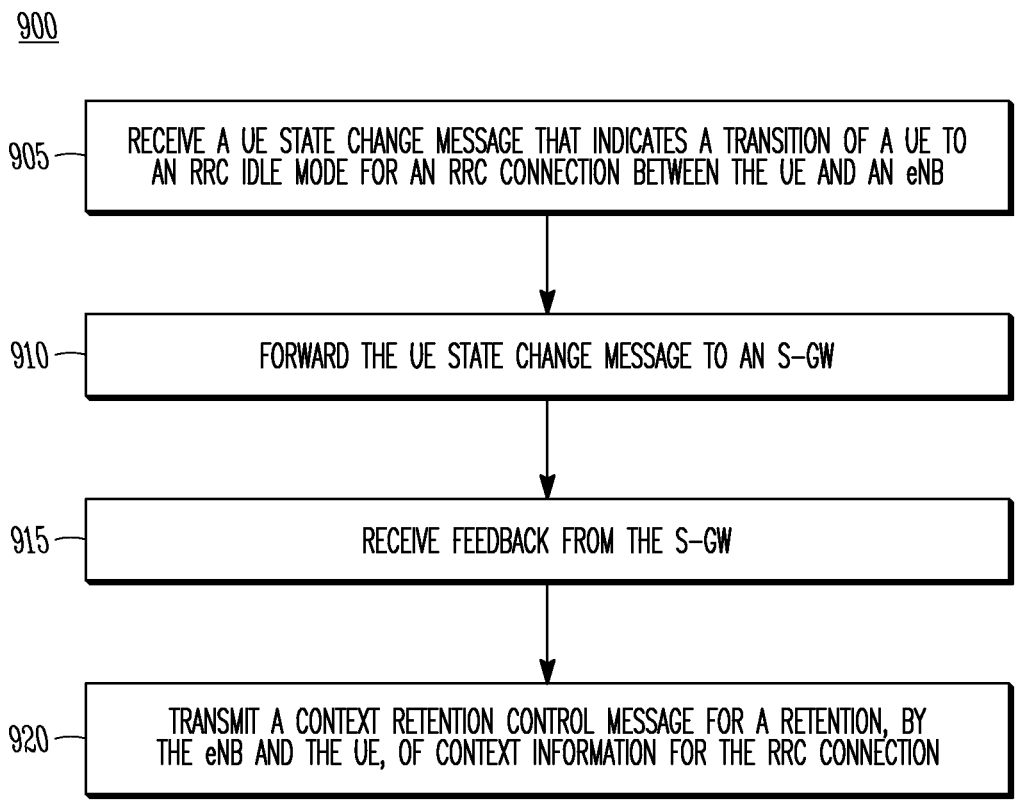
FIG. 9 illustrates the operation of another method of communication in accordance with some embodiments.

FIG. 9 illustrates the operation of another method of communication in accordance with some embodiments. As mentioned previously regarding the method 500, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 11, although it is understood that the method 900 may be practiced with any other suitable systems, interfaces and components. In addition, techniques and concepts described herein may be applicable to the method 900 in some cases, including the RRC connection, RRC idle mode, RRC connected mode, RRC connection release, context information, and/or others.

It should be noted that the method 900 may be practiced at the MME 122, and may include exchanging of signals or messages with the eNB 104. Similarly, the method 500 may be practiced at the eNB 104, and may include exchanging of signals or messages with the MME 122. In some cases, operations and/or techniques described as part of the method 500 may be relevant to the method 900. For instance, an operation of the method 500 may include transmission of a message by the eNB 104 while an operation of the method 900 may include reception of the same message or similar message at the MME 122.

At operation 905 of the method 900, the MME 122 may receive, from an eNB 104 configured to exchange data packets with a UE 102 on an RRC connection, a UE state change message. In some embodiments, the message may indicate a transition of the UE 102 to an RRC idle mode for the RRC connection. The transition may occur, in some cases, as a result of an expiration of an inactivity timer at the eNB 104, as described earlier. The message may also indicate a request by the eNB 104 to maintain context information for the RRC connection. In some cases, the S-GW 124 may be configured to transmit downlink data packets to the eNB 104 for forwarding to the UE 102 on the RRC connection. The UE state change message received at the MME 122 may also indicate a request by the eNB 104 to implicitly request the S-GW 124 to maintain the context information for the S1 bearer. As a non-limiting example, the UE state change message received at the MME 122 may be similar to, or the same as, the UE Context Retained/UE State Change Notification message 800. Referring to FIG. 7, the UE state change message may be transmitted by the eNB 104 to the MME 122 at operation 740.

At operation 910 of the method 900, the MME 122 may forward the UE state change message to the S-GW 124. Accordingly, the MME 122 may request to the S-GW 124 that the context information be retained for the S1 bearer or may inquire whether or not the S-GW 124 is capable of retaining the context information. It should be noted that the request may be made on behalf of the eNB 104 in some cases. As an example, the "UE State Change Notification and S1 Reuse Request" message, which will be described below, may be used, although embodiments are not limited to this message. In addition, the transmission of this message or similar messages from the MME 122 to the S-GW 124 may be included at operation 740 of FIG. 7.

At operation 915, the MME 122 may receive feedback related to the request from the S-GW 124. Accordingly, the feedback may indicate whether the context information may be retained for the S1 bearer. In some cases, the feedback may indicate a decision, by the S-GW 124, of whether to support the retention of the context information for the S1 bearer. As an example, the "S1 Reuse Response and UE State Notification Response" message, which will be described below, may be used, although embodiments are not limited to this message. In addition, the transmission of this message or similar messages from the S-GW 124 to the MME 122 may be included at operation 750 of FIG. 7.

It should be noted that the S-GW 124 may determine, at operation 745, whether or not the S1-U bearers will be retained for the UE 102 for the RRC connection. The determination may be based at least partly on one or more indicators or other information included in the UE state change message transmitted from the MME 122 to the S-GW 124 at operation 910. The determination may also be based at least partly on a capability of the S-GW 124 to retain the context for the UE 102 and/or other UEs 102. In some cases, the S-GW 124 may determine whether or not the S1-U bearers will be ready for usage. An example of such will be presented below in FIG. 11.

At operation 920 of the method 900, the MME 122 may transmit, to the eNB 104, a context retention control message for the RRC connection. The message may indicate support for retention of context information for subsequent exchanging of data packets on the RRC connection. In some embodiments, the decision of whether to support the retention of the context information may be based at least partly on capability information for the UE 102 that may be received at the MME 122 as part of an establishment of the RRC connection. In some embodiments, the decision may be based at least partly on whether the S-GW 124 supports retention of context information for the S1 bearer or otherwise.

In some embodiments, the context retention control message may be similar to, or the same as, the UE Context Retained/UE State Change Notification Response message 850. Referring to FIG. 7, the context retention control message and/or the message 850 may be transmitted by the MME 122 to the eNB 104 at operation 755. Accordingly, the context retention control message may indicate whether or not the MME 122 accepts a request from the eNB 104 to retain context information for the RRC connection. The context retention control message may also indicate whether or not the S-GW 124 accepts the request to retain the context information for the S1 bearer. As a non-limiting example, the UE state change message received at the MME 122 may be similar to, or the same as, the UE Context Retained/UE State Change Notification message 800. Referring to FIG. 7, the UE state change message may be transmitted by the eNB 104 to the MME 122 at operation 740.

Figure 10:
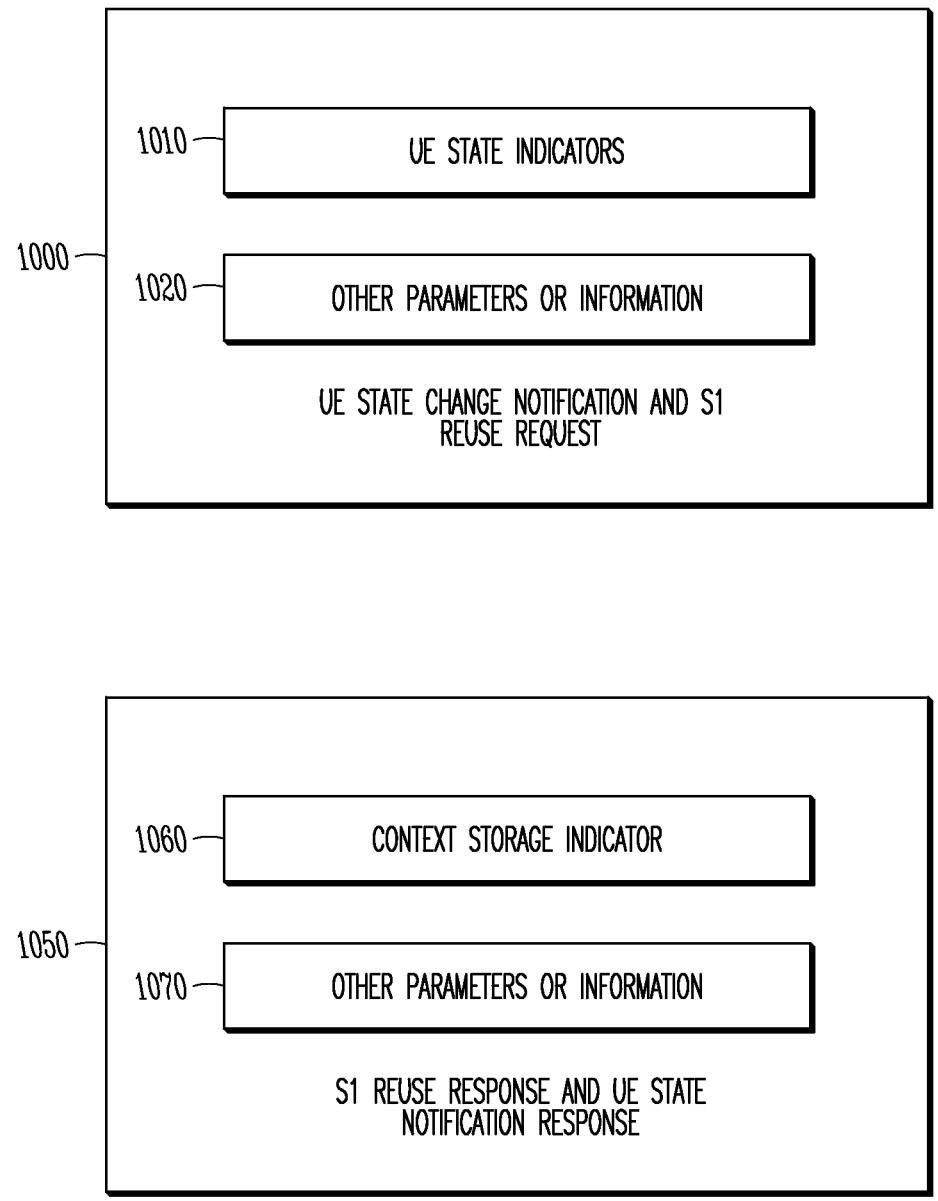
FIG. 10 illustrates additional example control messages related to UE context and UE state in accordance with some embodiments.

FIG. 10 illustrates additional example control messages related to UE context and UE state in accordance with some embodiments. Although embodiments are not limited as such, the messages 1000 and 1050 may be or may be similar to "UE State Change Notification and S1 Reuse Request" and/or "S1 Reuse Response and UE State Notification Response" messages that may be included in 3GPP standards or other standards. It should be noted that some embodiments may include some, any or all of the parameters shown in the example messages 1000 and 1050, and some embodiments may also include additional parameters not shown in the example messages 1000 and 1050. In addition, the order and format shown in the example messages 1000 and 1050 are not limiting, and are presented for illustrative purposes. Parameter values may be given in any suitable format. As an example, some parameters may be Boolean, taking on values such as yes/no or similar. As another example, some parameters may take values of any suitable number of bits or other digits. As another example, some parameters may take descriptive values, which may be mapped to numbers in some cases.

The UE State Change Notification and S1 Reuse Request message 1000 may be transmitted by the MME 122 to the S-GW 124. The message 1000 may include one or more UE state indicators 1010, which may take values such as "UE state change to Idle" or "UE state change to Connected." The message 1000 may include other parameters or information 1020, which may or may not be related to storage of context or the RRC connection. For instance, control information for the message 1000 may be included.

The S1 Reuse Response and UE State Notification Response 1050 may be transmitted by the S-GW 124 to the MME 122. As a non-limiting example, the message 1050 may be transmitted in response to reception of the message 1000 at the S-GW 124. The response message 850 may include a context storage indicator 1060, which may be related to release of the S1 bearer and/or retention of the context information for the UE 102. As an example, the context storage indicator 1060 may indicate to the MME 122 that the S1 bearer is to be released and/or that the context information is not to be retained. For instance, the indicator 1060 may be set to a value of "1" if the S1 release is imminent or if retaining the context information is not possible. The message 1050 may include other parameters or information 1070, which may or may not be related to storage of context or the RRC connection. For instance, control information for the message 1050 may be included.

Figure 11:
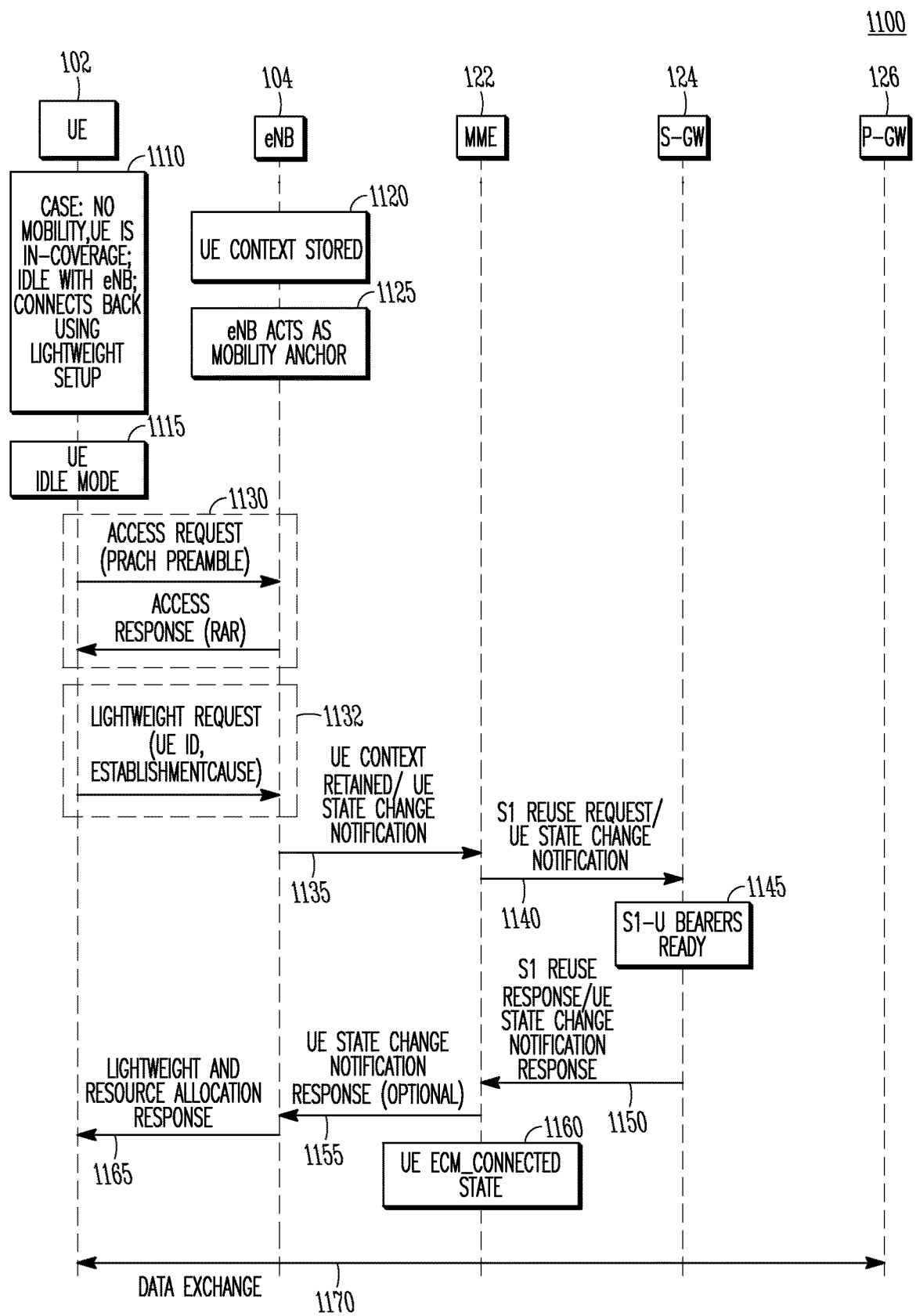
FIG. 11 illustrates another example message flow diagram in accordance with some embodiments.

FIG. 11 illustrates another example message flow diagram in accordance with some embodiments. Reference may be made to the message flow diagram 1100 for illustration of messages, interfaces and events that may be related to some embodiments, but the diagram 1100 is not limiting. Some embodiments may include operations that may be performed at the UE 102, eNB 104, MME 122 and/or S-GW 124, but embodiments are not limited to these devices. In some embodiments, the UE 102 may be a remote UE 102, although these embodiments are not limiting. In some cases, techniques and concepts described herein may be applicable to operations and/or events shown in FIG. 11, including the RRC connection, RRC idle mode, RRC connected mode, RRC connection release, context information, and/or others. Some embodiments may include one or more operations shown in FIG. 11, and some embodiments may also include other operations described herein. In addition, embodiments are not limited to the chronological order of operations shown in FIG. 11.

Referring to FIG. 11, the example message flow diagram 1100 may be applicable to a case in which the remote UE 102 is within network coverage and idle with the eNB 104 and may connect back to the eNB 104 using a "lightweight" setup. The eNB 104 may store context information for the remote UE 102 and may act as a mobility anchor. The remote UE 102 may be in an RRC idle mode, as indicated by 1115. An access procedure 1130 may include transmission by the remote UE 102 to the eNB 104 of an access request, which may include a physical random access channel (PRACH) preamble and/or other messages. The access procedure 1130 may also include transmission by the eNB 104 to the remote UE 102 of an access response, which may include a random access response (RAR) and/or other messages. At operation 1132, the remote UE 102 may transmit a lightweight request to the eNB 104, which may include information such as an identifier of the remote UE 102 (UE ID) and/or an establishment cause and/or other parameters or information. The lightweight request may be or may include a connection request from the remote UE 102. A message exchange that may include operations 1135, 1140, 1150, 1155 and others may be performed in response to the transmission of the lightweight request by the remote UE 102 and/or the reception of the lightweight request at the eNB 104.

As shown in FIG. 11, any or all of operations 1135, 1140, 1150, and 1155 may be included in some embodiments. Such operations may be similar to operations described regarding the example message flow diagram 700 in FIG. 7, although embodiments are not limited as such. A message exchange that may include operations 1135, 1140, 1150, 1155 and others may be performed in response to the transmission of the lightweight request by the remote UE 102 and/or the reception of the lightweight request at the eNB 104.

It should be noted that the S-GW 124 may determine, at operation 1145, whether or not the S1-U bearers will be ready for the UE 102 for the RRC connection. In addition, as indicated by 1160, the remote UE 102 may enter an ECM_connected state. At operation 1165, the eNB 104 may transmit, to the remote UE 102, a "lightweight and resource allocation response" message or other message to indicate that the remote UE 102 is connected and/or other information.

It should be noted that if the UE 102 has negotiated with the core network at the initial attach/connection setup and the MME 122 has agreed to support a light connection (such as in FIG. 11), it may not be necessary for the eNB 104 to inform the MME 122 and/or the S-GW 124 immediately upon releasing the connection for the UE 102. Accordingly, a savings in signaling may be realized in some cases, such as when the UE 102 does not receive downlink data. It should also be noted that the negotiation described above (for the MME 122 to support the light connection) may be extended, in some embodiments, to determine or decide a time duration for the MME 122 and/or S-GW 124 to support storage of the S1-U bearer context. As an example, a timer may be used for this purpose.

In Example 1, an apparatus for an Evolved Node-B (eNB) may comprise hardware processing circuitry and transceiver circuitry. The hardware processing circuitry may configure the transceiver circuitry to receive an uplink data packet from a User Equipment (UE) on a Radio Resource Control (RRC) connection between the eNB and the UE. The hardware processing circuitry may further configure the transceiver circuitry to transmit an RRC connection release message to the UE to indicate a transition of the UE to an RRC idle mode for the RRC connection. The RRC connection release message may include an indicator of whether the UE is to store context information for the RRC connection.

In Example 2, the subject matter of Example 1, wherein the indicator of whether the UE is to store the context information may be based at least partly on whether the UE is configured for Machine Type Communication (MTC) or Internet of Things (IoT) operation.

In Example 3, the subject matter of one or any combination of Examples 1-2, wherein the RRC connection release message may be transmitted in response to an expiration, at the eNB, of an inactivity timer for the UE.

In Example 4, the subject matter of one or any combination of Examples 1-3, wherein the context information may include an identifier of a data radio bearer (DRB) included in the RRC connection and an indicator for a security key for the RRC connection.

In Example 5, the subject matter of one or any combination of Examples 1-4, wherein the RRC connection release message may further indicate a suspension of the DRB included in the RRC connection.

In Example 6, the subject matter of one or any combination of Examples 1-5, wherein when the RRC connection release message indicates that the UE is to store the context information for the RRC connection, the hardware processing circuitry may be configured to retain the context information for the RRC connection.

In Example 7, the subject matter of one or any combination of Examples 1-6, wherein the hardware processing circuitry may further configure the transceiver circuitry to forward a downlink data packet to the UE on the RRC connection. The forwarding may be based at least partly on the retained context information.

In Example 8, the subject matter of one or any combination of Examples 1-7, wherein the hardware processing circuitry may further configure the transceiver circuitry to transmit, to a Mobility Management Entity (MME), an indicator that the RRC connection is a lightweight RRC connection for which the eNB is permitted to delay notification, to the MME, of a release of the lightweight RRC connection. The hardware processing circuitry may further configure the transceiver circuitry to receive, from the UE, a second uplink data packet on the lightweight RRC connection according to the retained context information.

In Example 9, the subject matter of one or any combination of Examples 1-8, wherein the indicator that the RRC connection is a lightweight RRC connection may be included in a "UE Context Retained/UE Connection Suspended" RRC control message.

In Example 10, the subject matter of one or any combination of Examples 1-9, wherein the hardware processing circuitry may further configure the transceiver circuitry to transmit to the MME, for forwarding to a serving gateway (S-GW), a control message that indicates a transition of the UE from the RRC idle mode to an RRC connected mode for the RRC connection. The control message may be transmitted in response to a reception of a connection request message from the UE.

In Example 11, the subject matter of one or any combination of Examples 1-10, wherein the hardware processing circuitry may further configure the transceiver circuitry to receive a second uplink data packet from the UE on the RRC connection according to the retained context information.

In Example 12, the subject matter of one or any combination of Examples 1-11, wherein the second uplink data packet may be received after the transmission of the RRC connection release message. The uplink data packet may be received prior to the transmission of the RRC connection release message.

In Example 13, the subject matter of one or any combination of Examples 1-12, wherein the hardware processing circuitry may further configure the transceiver circuitry to exchange one or more setup control messages for the RRC connection with a Mobility Management Entity (MME). The hardware processing circuitry may further configure the transceiver circuitry to restrict transmission, to the MME, of a control message for the transition of the UE to the RRC idle mode for the RRC connection.

In Example 14, the subject matter of one or any combination of Examples 1-13, wherein the restriction of the transmission may be performed during a wait period, and the hardware processing circuitry may further configure the transceiver circuitry to transmit the control message after the wait period.

In Example 15, the subject matter of one or any combination of Examples 1-14, wherein the hardware processing circuitry may further configure the transceiver circuitry to exchange one or more setup control messages for the RRC connection with a Mobility Management Entity (MME). The hardware processing circuitry may further configure the transceiver circuitry to transmit, to the MME, a control message that indicates the transition of the UE to the RRC connected mode from the RRC idle mode.

In Example 16, the subject matter of one or any combination of Examples 1-15, wherein the hardware processing circuitry to further configure the transceiver circuitry to exchange one or more setup control messages for the RRC connection with a Mobility Management Entity (MME). The hardware processing circuitry to further configure the transceiver circuitry to transmit, to the MME, a control message that indicates a transition of the UE from the RRC idle mode to an RRC connected mode for the RRC connection.

In Example 17, the subject matter of one or any combination of Examples 1-16, wherein the hardware processing circuitry may further configure the transceiver circuitry to transmit a second RRC connection release message for a second RRC connection between the eNB and a second UE. The second RRC connection release message may exclude indicators for storage of context information for the second RRC connection. The UE may be configured for Machine Type Communication (MTC) operation and the second UE may be configured for non-MTC operation.

In Example 18, the subject matter of one or any combination of Examples 1-17, wherein the apparatus may include one or more antennas coupled to the transceiver circuitry for the reception of the uplink data packet and for the transmission of the RRC connection release message.

In Example 19, a non-transitory computer-readable storage medium may store instructions for execution by one or more processors to perform operations for communication by an Evolved Node-B (eNB). The operations may configure the one or more processors to transmit a Radio Resource Control (RRC) connection release message that indicates that the eNB and a User Equipment (UE) are to retain context information for an RRC connection between the eNB and the UE. The operations may further configure the one or more processors to receive an uplink data packet from the UE on the RRC connection according to the retained context information.

In Example 20, the subject matter of Example 19, wherein the RRC connection release message may further indicate a transition of the UE to an RRC idle mode for the RRC connection.

In Example 21, the subject matter of one or any combination of Examples 19-20, wherein the uplink data packet may be received after the transmission of the RRC connection release message.

In Example 22, the subject matter of one or any combination of Examples 19-21, wherein the RRC connection release message may be transmitted in response to an expiration, at the eNB, of an inactivity timer for the UE.

In Example 23, an apparatus for a Mobility Management Entity (MME) may comprise hardware processing circuitry and transceiver circuitry. The hardware processing circuitry may configure the transceiver circuitry to receive, from an Evolved Node-B configured to exchange data packets with a User Equipment (UE) on a Radio Resource Control (RRC) connection, a UE state change message that indicates a transition of the UE to an RRC idle mode for the RRC connection. The hardware processing circuitry may further configure the transceiver circuitry to transmit a context retention control message for a retention, by the eNB and the UE, of context information for the RRC connection for subsequent exchanging of data packets on the RRC connection.

In Example 24, the subject matter of Example 23, wherein the UE state change message may indicate a request to retain the context information for the RRC connection. The context retention control message may indicate an acceptance response, by the MME, of the request to retain the context information.

In Example 25, the subject matter of one or any combination of Examples 23-24, wherein the hardware processing circuitry may further configure the transceiver circuitry to forward the UE state change message to a serving gateway (S-GW). The S-GW may be configured to transmit downlink data packets to the eNB for forwarding to the UE on the RRC connection. The acceptance of the request to retain the context information may be based on feedback from the S-GW.

In Example 26, the subject matter of one or any combination of Examples 23-25, wherein the acceptance of the request to retain the context information may be based at least partly on capability information for the UE that is received at the MME as part of an establishment of the RRC connection.

In Example 27, the subject matter of one or any combination of Examples 23-26, wherein the acceptance of the request to retain the context information may be based at least partly on whether the UE is configured for Machine Type Communication (MTC) operation or Internet of Things (IoT) operation.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) configured for cellular Internet of Things (IoT) operations, the apparatus comprising:
    memory; and
    processing circuitry,
    wherein the UE is configured with a Radio Resource Control (RRC) connection by an Evolved Node B (eNB), and
    wherein the processing circuitry is configured to:
    encode uplink data for transmission to the eNB and decode downlink data from the eNB using one or more data radio bearers (DRBs) of the RRC connection;
    decode an RRC Connection Release message, the RRC Connection Release message including one or more indicators to notify the UE to suspend the RRC connection including suspension of the DRBs of the RRC connection and to notify the UE to store Access Stratum (AS) context, wherein during the suspension of the RRC connection, the DRBs of the RRC connection remain established and inactive;
    store the AS context in the memory in response to the RRC Connection Release message notifying the UE to suspend the RRC connection;
    after storing the AS context, suspend the RRC connection and the one or more DRBs of the RRC connection; and
    configure the UE to enter RRC idle after suspending the RRC connection and suspending the DRBs of the RRC connection,
    wherein when the UE is RRC idle, the processing circuitry is configured to encode an RRC connection resume request message for transmission to the eNB in response to a paging message, and
    wherein in response to an RRC connection resume message from the eNB, the processing circuitry is configured to resume the established DRBs and re-establish a AS security context when transitioning to RRC connected from the RRC idle without DRB establishment.

2. The apparatus of claim 1, wherein the suspension of the RRC connection is initiated by the eNB by encoding, for transmission to a Mobility Management Entity (MME) over an S1 interface, a UE context release request message to indicate release of the RRC connection of the UE and to suspend the context of the UE, and
    wherein the RRC Connection Release message is sent to the UE in response to receipt of a UE context release response message from the MME.

3. The apparatus of claim 1, wherein the UE context release response message includes security context information including a security key for the RRC connection.

4. A non-transitory computer-readable hardware storage medium that stores instructions for execution by processing circuitry of a User Equipment (UE) configured for cellular Internet of Things (IoT) operations,
    wherein the UE is configured with a Radio Resource Control (RRC) connection by an Evolved Node B (eNB), and
    wherein the instructions to configure the processing circuitry to:
    encode uplink data for transmission to the eNB and decode downlink data from the eNB using one or more data radio bearers (DRBs) of the RRC connection;
    decode an RRC Connection Release message, the RRC Connection Release message including one or more indicators to notify the UE to suspend the RRC connection including suspension of the DRBs of the RRC connection and to notify the UE to store Access Stratum (AS) context, wherein during the suspension of the RRC connection, the DRBs of the RRC connection remain established and inactive;
    store the AS context in the memory in response to the RRC Connection Release message notifying the UE to suspend the RRC connection;
    after storing the AS context, suspend the RRC connection and the one or more DRBs of the RRC connection; and
    configure the UE to enter RRC idle after suspending the RRC connection and suspending the DRBs of the RRC connection,
    wherein when the UE is RRC idle, the processing circuitry is configured to encode an RRC connection resume request message for transmission to the eNB in response to a paging message, and
    wherein in response to an RRC connection resume message from the eNB, the processing circuitry is configured to resume the established DRBs and re-establish a AS security context when transitioning to RRC connected from the RRC idle without DRB establishment.

5. The computer-readable hardware storage medium of claim 4, wherein the suspension of the RRC connection is initiated by the eNB by encoding, for transmission to a Mobility Management Entity (MME) over an S1 interface, a UE context release request message to indicate release of the RRC connection of the UE and to suspend the context of the UE, and wherein the RRC Connection Release message is sent to the UE in response to receiving a UE context release response message from the MME.

6. The computer-readable hardware storage medium of claim 4, wherein the UE context release response message includes security context information including a security key for the RRC connection.

\* \* \* \* \*